US007358700B2

(12) United States Patent
Qian et al.

(10) Patent No.: US 7,358,700 B2
(45) Date of Patent: Apr. 15, 2008

(54) INDUCTION MOTOR CONTROLLER

(75) Inventors: Wei Qian, Shanghai (CN); Haihui Lu, Shanghai (CN); Thomas A. Nondahl, Wauwatosa, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/521,018

(22) Filed: Sep. 14, 2006

(65) Prior Publication Data

US 2008/0067971 A1    Mar. 20, 2008

(51) Int. Cl.
  *H02P 27/16* (2006.01)
(52) U.S. Cl. ............... 318/809; 318/801; 318/805; 388/917
(58) Field of Classification Search ........ 318/807–814, 318/727, 798–802, 805; 388/917
  See application file for complete search history.

(56) References Cited

U.S. PATENT DOCUMENTS

| | | | |
|---|---|---|---|
| 4,385,251 A | | 5/1983 | Mallick et al. |
| 4,405,873 A | | 9/1983 | Nondahl |
| 4,490,780 A | | 12/1984 | Nondahl |
| 4,856,965 A | * | 8/1989 | Katsuie et al. ............... 417/19 |
| 5,347,277 A | | 9/1994 | Nondahl et al. |
| 5,510,687 A | * | 4/1996 | Ursworth et al. ........... 318/727 |
| 6,172,498 B1 | | 1/2001 | Schmidt et al. |
| 6,218,749 B1 | | 4/2001 | Nondahl et al. |
| 6,351,397 B1 | * | 2/2002 | Sawa et al. ................... 363/50 |
| 6,504,275 B2 | | 1/2003 | Nondahl et al. |

OTHER PUBLICATIONS

Stephen J. Chapman, "Electric Machinery Fundamentals", Third Edition, McGraw-Hill Publishing, New York, 1999. Appendix A explains a three-phase circuit. Specifically, pp. 652-659 explains the relationship of phase quantity and line quantity between a delta-circuit configuration and a Y-circuit configuration.*

* cited by examiner

*Primary Examiner*—Bentsu Ro
(74) *Attorney, Agent, or Firm*—Patrick S. Yoder; Alexander R. Kuszewski

(57) ABSTRACT

An induction motor controller that may include three phase paths leading from a power input to a power output, a solid-state switching device interposed between the power input and the power output on each of the three phase paths, a voltage sensor coupled to two of the phase paths between the solid-state switching device and the power output, a current sensor on one of the phase paths, a processor communicatively coupled to the voltage sensor, the current sensor, and the solid state switching device; and a memory coupled to the processor. The processor may be configured to calculate a motor parameter based on a signal from the voltage sensor and a signal from the current sensor and store the calculated motor parameter in memory.

5 Claims, 4 Drawing Sheets

INDUCTION MOTOR CONTROLLER

BACKGROUND

The invention relates generally to motor controllers. Particularly, this invention relates to a motor controller capable of measuring parameters of an induction motor.

Differences among motors may decrease the precision with which some controllers operate. For instance, variations in the manufacturing process used to make motors may cause the motor parameters to be different from the motor parameters programmed into the controller. Further, during the life of an induction motor, certain motor parameters may change. For example, the resistance of a motor may change as the temperature of the motor increases during operation. These differences between expected and actual motor parameters may render certain control schemes less accurate. Motor parameters may also be used to diagnose conditions such as excessive motor temperatures or failing motor windings.

BRIEF DESCRIPTION

Certain embodiments of the present technique provide for an induction motor controller that includes three phase paths leading from a power input to a power output, a solid-state switching device interposed between the power input and the power output on each of the three phase paths, a voltage sensor coupled to two of the phase paths between the solid-state switching device and the power output, a current sensor on one of the phase paths, a processor communicatively coupled to the voltage sensor, the current sensor, and the solid state switching device; and a memory coupled to the processor. In some embodiments, the processor is configured to calculate a motor parameter based on a signal from the voltage sensor and a signal from the current sensor and store the calculated motor parameter in memory.

In another aspect, certain embodiments of the present technique provide for an induction motor controller that includes a phase path, a power supply voltage sensor coupled to the phase path, a silicon controlled rectifier (SCR) in the phase path, a motor voltage sensor coupled to the phase path, a motor current sensor in the phase path, memory, and an SCR controller. In some embodiments, the SCR controller is communicatively coupled to the power supply voltage sensor, the SCR, the motor voltage sensor, and the motor current sensor. The SCR controller may have a processor and memory, depending on the embodiment. In certain applications, the processor is configured to trigger the SCR a first predetermined time before a supplied voltage crosses zero volts, receive a motor voltage signal from the motor voltage sensor, receive a motor current signal from the motor current sensor, and calculate parameters of an induction motor based on the motor voltage signal and the motor current signal received after triggering the SCR. In some of these embodiments, the processor is configured to store the parameters in memory.

In another aspect, embodiments of the present technique provide for a method that includes the following steps: sensing a power supply voltage; energizing a gate of an SCR in response to, at least in part, the sensed power supply voltage; and measuring an inductance, resistance, or both of an induction motor.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
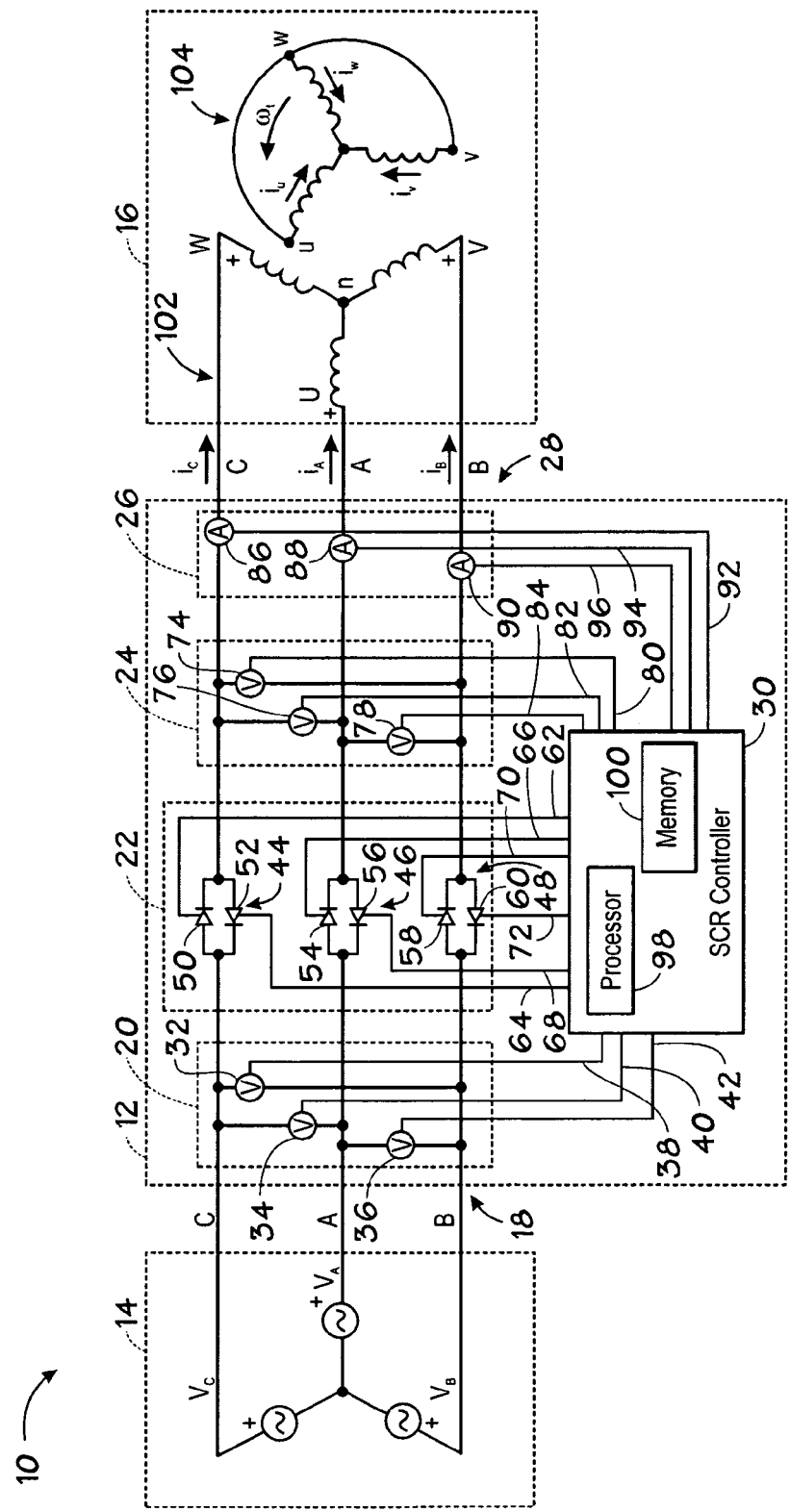
FIG. 1 illustrates an exemplary induction motor system in accordance with an embodiment of the present technique.

FIG. 1 depicts an exemplary induction motor system 10 having a motor controller 12, a power supply 14, and an induction motor 16. As described further below, the exemplary controller 12 may be capable of measuring various parameters of the motor 16, such as inductance and resistance. To this end, in some embodiments, the motor controller 12 may conduct a pulse of current through the motor 12 and sense a transient response of the motor 16 to the pulse of current. The motor controller 12 may calculate motor parameters based on the sensed transient response and store the calculated motor parameters in memory. Advantageously, measuring parameters of the motor 16 may tend to facilitate control of the motor 16 in some embodiments. Further, certain measured motor parameters may aid troubleshooting and setting a duty cycle for the motor 16, as explained further below. Prior to addressing the motor controller 12 in detail, the features of the power supply 14 are explained.

The illustrated power supply 14 is a three-phase, 60 Hz power supply that outputs three sinusoidally varying voltages $V_A$, $V_B$, and $V_C$. Other embodiments may include power supplies 14 capable of outputting a different number of phases, a different frequency, and/or a different voltage waveform. In operation, currents driven by the voltages $V_A$, $V_B$, and $V_C$ flow through phase paths A, B, and C respectively between the power supply 14 and the motor controller 12.

The motor controller 12 of FIG. 1 is configured to accept and control currents driven by the three sinusoidally varying voltage waveforms $V_A$, $V_B$, and $V_C$ by selectively transmitting a portion of each voltage cycle. To accomplish this, the illustrated motor controller includes a power input 18, a supply cycle monitor 20, a switching unit 22, a motor voltage monitor 24, a motor current monitor 26, a power output 28, and a silicon controlled rectifier (SCR) controller 30. The illustrated power input 18 continues the phase paths A, B, and C into the motor controller 12 from the power supply 14. The phase paths A, B, and C extend through the motor controller 12, and the power output 28 extends the phase paths A, B, and C out of the motor controller 12 to the induction motor 16.

The exemplary supply cycle monitor 20 includes three voltage sensors 32, 34, and 36 coupled to each pair of the three phase paths A, B, and C. In the presently discussed embodiment, the voltage sensors 32, 34, and 36 couple to the phase paths A, B, and C between the power supply 14 and the switching unit 22. The illustrated voltage sensors 32, 34, and 36 are configured to sense line-to-line voltages among the phase paths A, B, and C on the power supply 14 side of the switching unit 22. Supply voltage signals 38, 40, 42 communicatively couple the voltage sensors 32, 34, and 36 respectively to the SCR controller 30 and indicate the sensed line-to-line voltages. The illustrated supply cycle monitor 20 is integrated within the motor controller 12.

In other embodiments, a portion of the supply cycle monitor 20 may be separate from motor controller 12 and, in some embodiments, integrated into the power supply 14. Further, some embodiments may include fewer voltage sensors 32, 34, or 36, such as two or one, which is not to suggest that other features discussed herein may not also be omitted. For instance in embodiments having one voltage sensor 32 constituting the supply cycle monitor 20, the SCR controller 30 may estimate the voltage of the non-sensed phases by adding or subtracting 120 degrees to the phase angle of a sensed voltage. Alternatively, or additionally, the supply cycle monitor 20 may include other circuitry adapted to synchronize subsequently discussed operations of the SCR controller 30 with the cycle of the power supply 14.

Currents on the phase paths A, B, and C may be regulated by the exemplary switching unit 22, which includes solid-state switches, thryristors, or SCR pairs 44, 46, and 48 having SCRs 50 and 52, 54 and 56, and 58 and 60, respectively. In the illustrated embodiment, each SCR pair 44, 46, and 48 is serially disposed on one of the phase paths A, B, and C, respectively. Within each exemplary SCR pair 44, 46, and 48, SCRs 50 and 52, 54 and 56, and 58 and 60 are oppositely oriented and connected in parallel to the phase paths A, B, and C, respectively. Gate signals 62, 64, 66, 68, 70, and 72 connect the SCR controller 30 to a gate of each of the SCRs 50, 52, 54, 56, 58, and 60, respectively. While the illustrated embodiment does not employ an insulated gate bipolar transistor (IGBT) to modulate currents through the phase paths A, B, or C, other embodiments in accordance with the present technique may include IGBTs or other switching devices. For instance, in some embodiments, the switching unit 22 may include a matrix converter.

The motor voltage monitor 24 of FIG. 1 features three motor voltage sensors 74, 76, and 78 arranged to sense the line-to-line voltage between each of the phase paths A, B, and C. The motor voltage sensors 74, 76, and 78 may couple to the phase paths A, B, and C between the switching unit 22 and the induction motor 16. Motor voltage signals 80, 82, and 84 may communicatively couple the motor voltage sensors 74, 76, and 78 to the SCR controller 30 and carry signals indicative of line-to-line voltages of the induction motor 16.

Here again, as with many of the other features discussed herein, certain embodiments may not include three motor voltage sensors 74, 76, and 78. For instance, some embodiments may include one or two voltage sensors 74, 76, or 78. Further, in some embodiments, the motor voltage monitor 24 may be integrated into the supply cycle monitor 12 and the motor voltage monitor 24 may be omitted, which is not to suggest that any other feature may not also be omitted.

The motor current monitor 26 may have three motor current sensors 86, 88, 90 each disposed in one of the phase paths A, B, or C. In various embodiments, the current sensors may be between the induction motor 16 and the switching unit 22, between the switching unit 22 and the power supply 14, or dispersed in some combination thereof, for example. Motor current signals 92, 94, and 96 communicatively couple the motor current sensors 86, 88, and 90 to the SCR controller 30 and carry signals indicative of the current through phase paths A, B, and C. It should be noted that certain embodiments may include fewer current monitors 86, 88, and 90, such as one or two.

The illustrated SCR controller 30 includes a processor 98 and memory 100. The processor 98, memory 100, and their respective sub-components may be partially or entirely integrated into a single device, or separately disposed. The processor 98 may include a microprocessor, a microcontroller, and/or a digital signal processor (DSP), for instance. The illustrated memory 100 may include volatile memory, such as dynamic random access memory (DRAM), and/or non-volatile memory, such as magnetic storage, optical storage, and/or flash memory, for instance. The processor 98 may communicatively couple to both the memory 100 and signals 38, 40, 42, 62, 64, 66, 68, 70, 72, 80, 82, 84, 92, 94, and/or 96.

The induction motor 16 of FIG. 1 is coupled to the motor controller 12 via phase paths A, B, and C. The present induction motor 16 will include a stator 102 and a rotor 104. The stator 102 will typically include a stator core constructed from a plurality of steel laminations and a plurality of windings coupled to each pair of the phase paths A, B, and C through the motor terminals U, V, and W. The rotor 104 may also include a plurality of windings, for example in certain types of traction motors, or a number of bars (such as 36) connected by end rings, for instance in a squirrel cage rotor. In some embodiments, the rotor 104 may include a cast core with copper bars and end rings. The rotor may be concentrically disposed within stator 102 and rotatably supported, for instance by bearings. In FIG. 1, the direction of rotation and an angular position of the rotor is indicated by the arrow labeled $\omega_r$.

In normal operation, alternating currents through each of the phase paths A, B, and C create a rotating magnetic field in the induction motor 16. Through electromagnetic induction, the rotating magnetic field induces a current in the conductors of the rotor 104, which in turn creates a counterbalancing magnetic field that causes the rotor 104 to turn in the direction the field is rotating. Generally, the rotor 104 turns slower that the rotating magnetic field.

The motor controller 12 may modulate currents $i_A$, $i_B$, and $i_C$ conducted by phase paths A, B, and C to control the starting and/or stopping performance of the induction motor 16. As the voltages $V_A$, $V_B$, and $V_C$ oscillate, the SCR controller 30 energizes the gates of the SCRs 50, 52, 54, 56, 58, and 60 during the portion of the voltage cycle in which the SCRs 50, 52, 54, 56, 58, and 60 are forward biased. By waiting to energize the gates for some time delay (or firing angle) after the SCRs 50, 52, 54, 56, 58, and 60 become forward biased, the SCR controller 30 may increase or decrease the currents $i_A$, $i_B$, and $i_C$ on phase paths A, B, and C. Generally, a longer delay reduces the portion of each power supply cycle that drives currents $i_A$, $i_B$, or $i_C$, and a shorter delay increases the portion of each power supply cycle that drives currents $i_A$, $i_B$, or $i_C$. To energize the gates of SCRs 50, 52, 54, 56, 58, and 60, the SCR controller may drive a pulse of current on gate signals 62, 64, 66, 68, 70, 72. Once the gates are energized and current starts to flow, the SCRs 50, 52, 54, 56, 58, and 60 will continue conducting current until the currents fall to zero, at which point they turn off until the next time their gate is energized. Thus, in some embodiments, the SCR controller 30 may adjust the time during each cycle of the power supply 14 at which the SCRs 44, 46, and 48 are turned on to control the power delivered to the induction motor 16. For example, in some embodiments, the motor controller 12 may gradually decrease the firing angle of each SCR 44, 46, and 48 to soft-start the induction motor 16.

Figure 2:
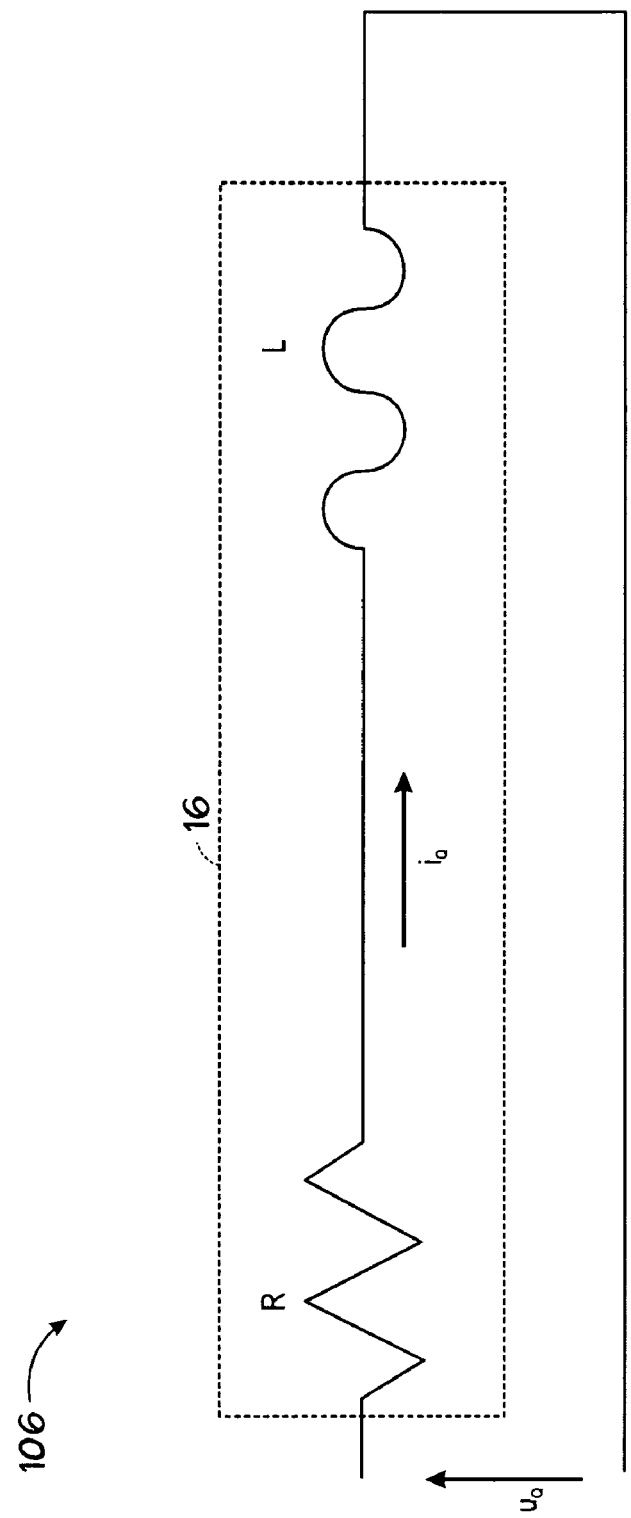
FIG. 2 illustrates an exemplary, simplified circuit model of the induction motor of FIG. 1 in accordance with an embodiment of the present technique.

As discussed above, the illustrated motor controller 12 may measure motor parameters, such as inductance and resistance. FIG. 2 depicts a simplified model circuit 106 that is used below to explain how the exemplary motor controller 12 calculates motor parameters. The model circuit 106 corresponds to the induction motor system 10 under the following simplifying assumptions: phase paths A and B are closed, phase path C is open, the rotor 104 is not rotating, and the back emf of the motor is negligible. That is, the illustrated model circuit 106 generally corresponds to a circuit in which current flows through phase paths A and B but not C. For example, the illustrated circuit model 106 may represent the induction motor system 10 when SCRs 54 and 60 are turned on and SCRs 50, 52, 56, and 58 are turned off. Consequently, in the illustrated circuit model 106, $u_Q$ may generally correspond to the difference between $V_A$ and $V_B$. Similarly, the current $i_Q$ may generally correspond to the current $i_A$ and the negative of current $i_B$ (due to the difference in direction). The combined, dynamic equivalent series resistance of the rotor 104 and the stator 102 is generally represented by resistance R, and the combined, dynamic equivalent series inductance of the rotor 104 and the stator 102 is generally represented by the inductance L. The relationship between current $i_Q$, voltage $u_Q$, resistance R, and inductance L in model circuit 106 is expressed by the following differential equation, which is used below to estimate R and L:

$$u_Q \approx Ri_Q + L di_Q/dt \quad \text{(Equation 1)}$$

It should be noted that the choice of phase paths A and B to correspond to the model circuit 106 is arbitrary, and other pairs of phase paths may behave in a manner generally corresponding to the behavior of the model circuit 106. For instance, the pairing of phase paths A and C and the pairing of phase paths B and C are also represented by the model circuit 106.

Figure 3:
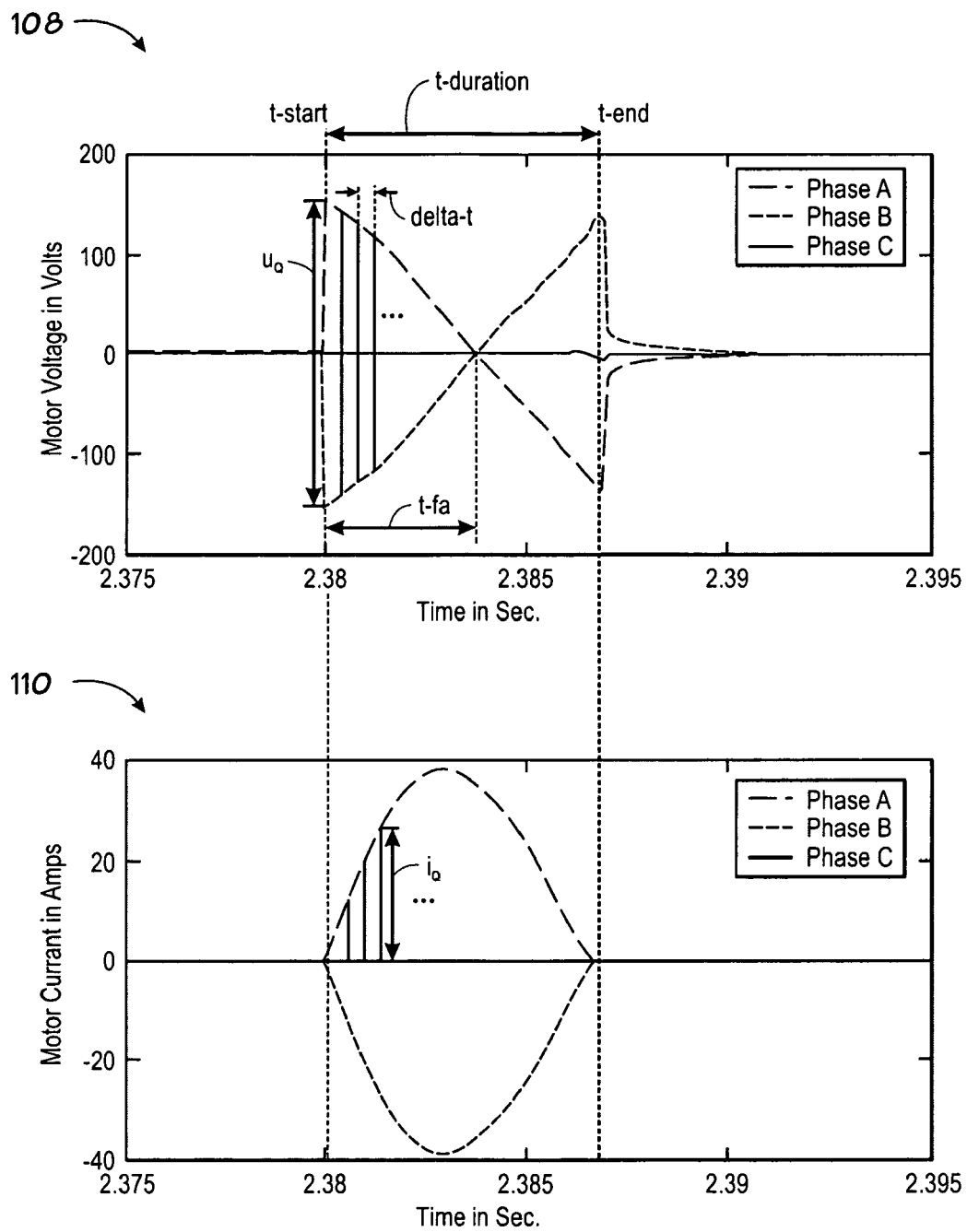
FIG. 3 depicts sample current and voltage traces of the induction motor of FIG. 1 during an exemplary diagnostic operation in accordance with embodiments of the present technique.
Figure 4:
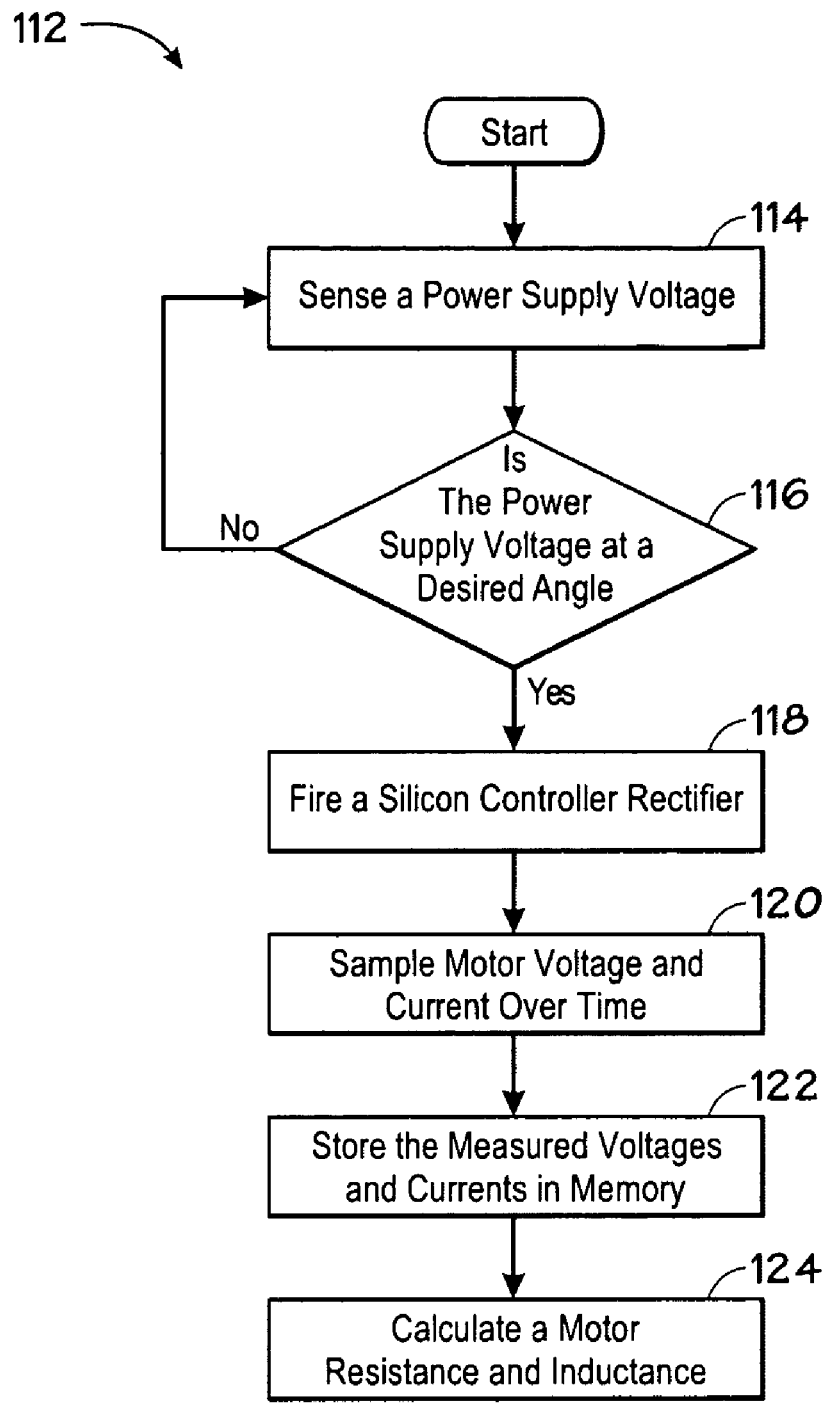
FIG. 4 illustrates an exemplary diagnostic operation in accordance with an embodiment of the present technique.

FIG. 4 illustrates an exemplary measurement procedure 112, and FIG. 3. depicts voltage and current traces that may arise during the exemplary measurement procedure 112. As described below, the exemplary measurement procedure 112 may result in a short portion of a voltage cycle on two phase paths being transmitted to the induction motor 16 and a transient response of the induction motor 16 being measured. Equation 1 may be used in combination with data gathered during the measurement procedure 112 to calculate motor parameters.

To determine when to begin conducting current through the induction motor 16, the exemplary measurement procedure 112 begins with sensing a power supply voltage, as depicted by block 114 in FIG. 4. In the embodiment of FIG. 1, the supply cycle monitor 20 may sense the power supply voltage. For example, voltage sensor 36 may sense the power supply voltage between phase A and phase B and output supply voltage signal 42.

The SCR controller 30 may monitor the supply voltage signal 42 and determine if the power supply voltage is at a pre-determined or desired angle, as depicted by block 116 in FIG. 4. The desired phase angle corresponds to time t-fa, which, in the present example, is defined as the length of time before the voltage of phase A and the voltage of phase B are equal, i.e., before $u_Q$ reaches zero.

The magnitude of t-fa is selected in view of both the current carrying capacity of the induction motor 16 and the rapidity with which a transient response of the induction motor 16 can be measured. As the resistance of the stator 102 and rotor 104 may be relatively low, even relatively small voltages may result in large currents through the induction motor 16. Further, the stator 102 and rotor 14, which typically has fewer windings than the stator 102, effectively form a step-down transformer, so the currents in the rotor 104 may be particularly large. The larger t-fa is, the larger $u_Q$ is at t-start and the greater the currents in the induction motor 16. Counterbalancing these considerations, t-fa is selected to be large enough that the transient response of the induction motor 16 is measurable. As explained below, induction motor currents $i_Q$ and voltages $u_Q$ may be sampled during the transient response and used to calculate various parameters of the induction motor 16. The duration of the transient response and rate of sampling may determine the number of samples that are used in these calculations.

At time t-start, which is t-fa before $u_Q$ reaches zero, the motor controller 12 may fire one or more SCRs, as depicted by block 118 of FIG. 4. For instance, in the embodiment of FIG. 1, the SCR controller 30 may transmit gate signals 66 and 72 to fire the pair of SCRs 54 and 60, respectively. The gate signals 66 and 72 may close phase paths A and B to current $i_A$ flowing from phase path A to phase path B, through two serially connected windings of the induction motor 16. That is, in the presently discussed example, energizing the gates of SCRs 54 and 60 at time t-start applies voltage $u_Q$ across both the winding associated with phase path A and the winding associated with phase path B.

FIG. 3 illustrates an exemplary transient response of the induction motor 16 to the application of voltage $u_Q$. In FIG. 3, the time axes of the voltage traces and the current traces are matched to one another. Starting with the voltage traces, in the currently discussed embodiment, $u_Q$ is at its largest magnitude at time t-start. Then, as phase A voltage $V_A$ and phase B voltage $V_B$ converge over time t-fa, $u_Q$ decreases to zero. Next, $u_Q$ inverts during the time period after t-fa has passed, as the sinusoidally varying voltages $V_A$ and $V_B$ cross and continue past one another. At this point, it is important to keep in mind that, once an SCR is turned on, it will stay on until current stops flowing. Thus, even though the SCRs 54 and 60 are not forward biased after time t-fa has passed, they continue to apply the voltage $u_Q$ to the induction motor 16 until the current trace drops to zero. Finally, the current $i_Q$ is driven to zero by the inversion of $u_Q$ and the SCRs 54 and 60 turn off, thereby largely ending the transient response of the induction motor 16.

Turning to the current traces of FIG. 3, at time t-start, the current $i_Q$ increases from zero when the SCRs 54 and 60 are turned on. As noted above, in the present example, $i_Q$ corresponds to the current $i_A$ and the inverse of current $i_B$, which has the opposite direction of $i_A$. As time passes, the current $i_Q$ increases to a peak some time before t-fa and is then driven back to zero as $u_Q$ inverts in the presently discussed embodiment.

The transient response depicted by FIG. 3 may be used to estimate parameters of the induction motor 16, such as resistance and inductance. As depicted by block 120 of FIG. 4, the motor current and voltage may be sampled over time. For instance, in a digital implementation of the present technique, the voltage $u_Q$ and resulting current $i_Q$ may be sampled at intervals, such as regular intervals of delta-t. In some embodiments, delta-t may be less than or approximately equal to 50 microseconds, 30 microseconds, 20 microseconds, 10 microseconds, 7 microseconds, 5 microseconds, 3 microseconds, or 1 microsecond, for example. The motor voltage monitor 24 (or the supply cycle monitor 20 in some embodiments) may sense the difference between voltages $V_U$ and $V_V$ or individually sense voltages $V_U$ and $V_V$ and the motor current monitor 26 may sense currents $i_A$ and/or $i_B$. The current and voltage values may be transmitted to the SCR controller 30, which may store them, or some value based on them, in memory 100, as depicted by block 122 in FIG. 4.

Finally, the stored current and voltage values may be used to estimate motor parameters, as depicted by block 124 in FIG. 4. In some embodiments, a search algorithm, such as the least squares method, linear mean square method, or maximum likelihood method, may be used in conjunction with equation 1 above to calculate motor resistance and inductance. The search algorithm may be used to select values of R and L that minimize differences between $i_Q$ values calculated by inputting measured $u_Q$ values into equation 1 and actual $i_Q$ values measured during the transient response. For instance, using a least squares approach, the processor 98 of the SCR controller 30 may calculate the resistance and inductance of the induction motor 16 with the following equations, wherein k is an index for each sample, N is the total number of samples, and A-F are precursor values for calculating R and L:

Step 1:

$$\begin{cases} A = \sum_{k=0}^{N} (i_{Qk})^2; & B = C = \sum_{k=0}^{N} \left(i_{Qk} \frac{di_{Qk}}{dt}\right) \\ C = \sum_{k=0}^{N} \left(i_{Qk} \frac{di_{Qk}}{dt}\right); & D = \sum_{k=0}^{N} \left(\frac{di_{Qk}}{dt}\right)^2 \\ E = \sum_{k=0}^{N} (i_{Qk} u_{Qk}); & F = \sum_{k=0}^{N} \left(\frac{di_{Qk}}{dt} u_{Qk}\right) \end{cases}$$

Step 2:

$$\begin{cases} R = \frac{ED - FB}{AD - BC} \\ L = \frac{FA - EB}{AD - BC} \end{cases}$$

Finally, the values of inductance and resistance may be stored in memory 100. The values are then used to control the operation of the induction motor 16 and/or troubleshoot problems with its operation. For example, the peak motor current that is expected to flow with a given voltage and a given firing angle may be calculated. Additionally, the motor temperature may be estimated, as a higher resistance may generally correspond to a higher temperature. The SCR controller may store a table or formula that correlates motor temperature and resistance in memory 100. In some embodiments, the motor controller 12 may regulate currents flowing through the induction motor 16 based on an estimated motor temperature.

The resistance and inductance values may also be used to identify incorrectly installed or failing motor windings. The memory 100 may store an expected resistance and/or inductance value, which may be compared to a calculated value to determine if a motor winding is incorrectly installed or failing. Alternatively, or additionally, multiple measurement procedures 112 may be performed to identify resistance and/or inductance values associated with windings for each phase. The SCR controller 30 may store the values for two or more phases in memory 100 and identify a failing or flawed winding based on differences between the motor parameters for each phase.

In some embodiments, multiple measurement procedures 112 may be employed to calculate additional motor parameters. For example, two or more measurement procedures 112 may be performed with different times t-fa. Differences between the values of R and L calculated with each test may then be used to calculate certain variations of motor parameters due to factors such as magnetic saturation. These parameters may then be used to enhance control of motor speed and/or torque and/or troubleshoot the induction motor 16.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An induction motor controller, comprising:
   a phase path;
   a power supply voltage sensor coupled to the phase path;
   a silicon controlled rectifier (SCR) in the phase path;
   a motor voltage sensor coupled to the phase path;
   a motor current sensor in the phase path; and
   an SCR controller communicatively coupled to the power supply voltage sensor, the SCR, the motor voltage sensor, and the motor current sensor, the SCR controller having a processor and a memory, wherein the processor is configured to trigger the SCR a first predetermined time before a supplied voltage crosses zero volts, receive a motor voltage signal from the motor voltage sensor, receive a motor current signal from the motor current sensor, and calculate parameters of an induction motor based on the motor voltage signal and the motor current signal received after triggering the SCR, and wherein the processor is configured to store the parameters in the memory.

2. The induction motor controller of claim 1, wherein the power supply voltage sensor and the motor voltage sensor are different sensors on opposing sides of the SCR.

3. The induction motor controller of claim 1, wherein the parameters of the induction motor comprise a motor inductance and a motor resistance.

4. The induction motor controller of claim 1, wherein the SCR controller is configured to run a least square algorithm, a least mean square algorithm, a maximum likelihood algorithm, or a combination thereof to calculate parameters of the induction motor.

5. The induction motor controller of claim 1, wherein the SCR controller is configured to trigger the SCR at a second predetermined time different from the first predetermined time before the supplied voltage crosses zero and calculate a saturation value for the induction motor.

* * * * *